(12) United States Patent
Chung et al.

(10) Patent No.: US 10,467,324 B2
(45) Date of Patent: Nov. 5, 2019

(54) DATA PACKING TECHNIQUES FOR HARD-WIRED MULTIPLIER CIRCUITS

(71) Applicant: Microsoft Technology Licensing, LLC, Redmond, WA (US)

(72) Inventors: Eric Sen Chung, Woodinville, WA (US); Jeremy Halden Fowers, Seattle, WA (US); Shlomo Alkalay, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 15/603,908

(22) Filed: May 24, 2017

(65) Prior Publication Data

US 2018/0341622 A1    Nov. 29, 2018

(51) Int. Cl.
| | |
|---|---|
| *G06F 17/16* | (2006.01) |
| *G06F 7/46* | (2006.01) |
| *G06F 7/53* | (2006.01) |
| *G06F 17/10* | (2006.01) |
| *G06N 20/00* | (2019.01) |

(52) U.S. Cl.
CPC .............. *G06F 17/16* (2013.01); *G06F 7/462* (2013.01); *G06F 7/53* (2013.01); *G06F 17/10* (2013.01); *G06F 2207/3828* (2013.01); *G06N 20/00* (2019.01)

(58) Field of Classification Search
CPC ....................................................... G06F 17/16
USPC ................................. 708/523–524, 620–630
See application file for complete search history.

(56) References Cited

U.S. PATENT DOCUMENTS

| | | | | |
|---|---|---|---|---|
| 4,817,029 A | * | 3/1989 | Finegold .............. | G06F 7/5324 708/630 |
| 5,880,985 A | * | 3/1999 | Makineni ............. | G06F 7/5338 708/625 |

(Continued)

FOREIGN PATENT DOCUMENTS

WO    2015175154 A1    11/2015

OTHER PUBLICATIONS

Zhang, et al., "Optimizing FPGA-based Accelerator Design for Deep Convolutional Neural Networks", In Proceedings of the ACM/SIGDA International Symposium on Field-Programmable Gate Arrays, Feb. 22, 2015, pp. 161-170.

(Continued)

*Primary Examiner* — Tan V Mai
(74) *Attorney, Agent, or Firm* — Watson Patents, PLC; Vladan M. Vasiljevic

(57) ABSTRACT

A method is provided that includes providing a hard-wired integer multiplier circuit configured to multiply a first physical operand and a second physical operand, mapping a first logical operand to a first portion of the first physical operand, mapping a second logical operand to a second portion of the first physical operand, and mapping a third logical operand to the second physical operand. The method further includes multiplying the first physical operand and the second physical operand using the hard-wired integer multiplier circuit to provide a multiplication result that includes a first portion including a product of the first logical operand and the third logical operand, and a second portion including a product of the second logical operand and the third logical operand.

20 Claims, 11 Drawing Sheets

(56) References Cited

U.S. PATENT DOCUMENTS

| | | | |
|---|---|---|---|
| 6,523,055 B1 * | 2/2003 | Yu | G06F 7/5443 708/603 |
| 8,386,553 B1 * | 2/2013 | Langhammer | G06F 17/10 708/620 |
| 9,600,235 B2 * | 3/2017 | Iyer | G06F 7/525 |
| 2008/0319933 A1 | 12/2008 | Moussa et al. | |

OTHER PUBLICATIONS

Courbariaux, et al., "Training Deep Neural Networks with Low Precision Multiplications", In Proceedings of 3rd International Conference on Learning Representations, May 7, 2015, pp. 1-10.

Emir, et al., "A genetic algorithm based resources optimization methodology for implementing Artificial Neural Networks on FPGAs", In Proceedings of 12th IEEE International Conference on Electronics, Circuits and Systems, Dec. 11, 2015, 4 pages.

Savich, et al., "The Impact of Arithmetic Representation on Implementing MLP-BP on FPGAs: A Study", In Journal of IEEE Transactions on Neural Networks, vol. 18, No. 1, Jan. 2007, pp. 240-252.

Harris, "Mixed-Precision Programming with CUDA 8", https://developer.nvidia.com/accelerated-computing, Oct. 19, 2016, 7 pages.

Sjalander, et al., "An Efficient Twin-Precision Multiplier", Proceedings, IEEE International Conference on Computer Design: VLSI in Computers and Processors, Oct. 11-13, 2004, 4 pages.

Sjalander, et al., "Multiplication Acceleration Through Twin Precision", IEEE Transactions on Very Large Scale Integration (VLSI) Systems, vol. 17, No. 9, Sep. 2009, pp. 1233-1246.

Zucker et al., "Reuse of High Precision Arithmetic Hardware to Perform Multiple Concurrent Low Precision Calculations", Technical Report CLS-TR-94-616, Apr. 1994, 31 pages.

Fu, et al., "Deep Learning with INT8 Optimization on Xilinx Devices", Retrieved from https://www.xilinx.com/support/documentation/white_papers/wp486-deep-learning-int8.pdf, Apr. 24, 2017, 11 Pages.

Gao, et al., "Efficient Realization of Large Size Two's Complement Multipliers Using Embedded Blocks in FPGAs", In Journal of Circuits, Systems & Signal Processing, vol. 27, Issue 5, Sep. 5, 2008, pp. 713-731.

"International Search Report and Written Report Issued in PCT Application No. PCT/US18/028980", dated Jul. 26, 2018, 11 Pages.

Roth, et al., "A 51x51 Multiplier Design Based on Signed 18x18 and Unsigned 17x17 Multipliers", Retrieved from http://citeseerx.ist.psu.edu/viewdoc/download?doi=10.1.1.719.8384&rep=rep1&type=pdf, Apr. 15, 2008, 22 Pages.

* cited by examiner

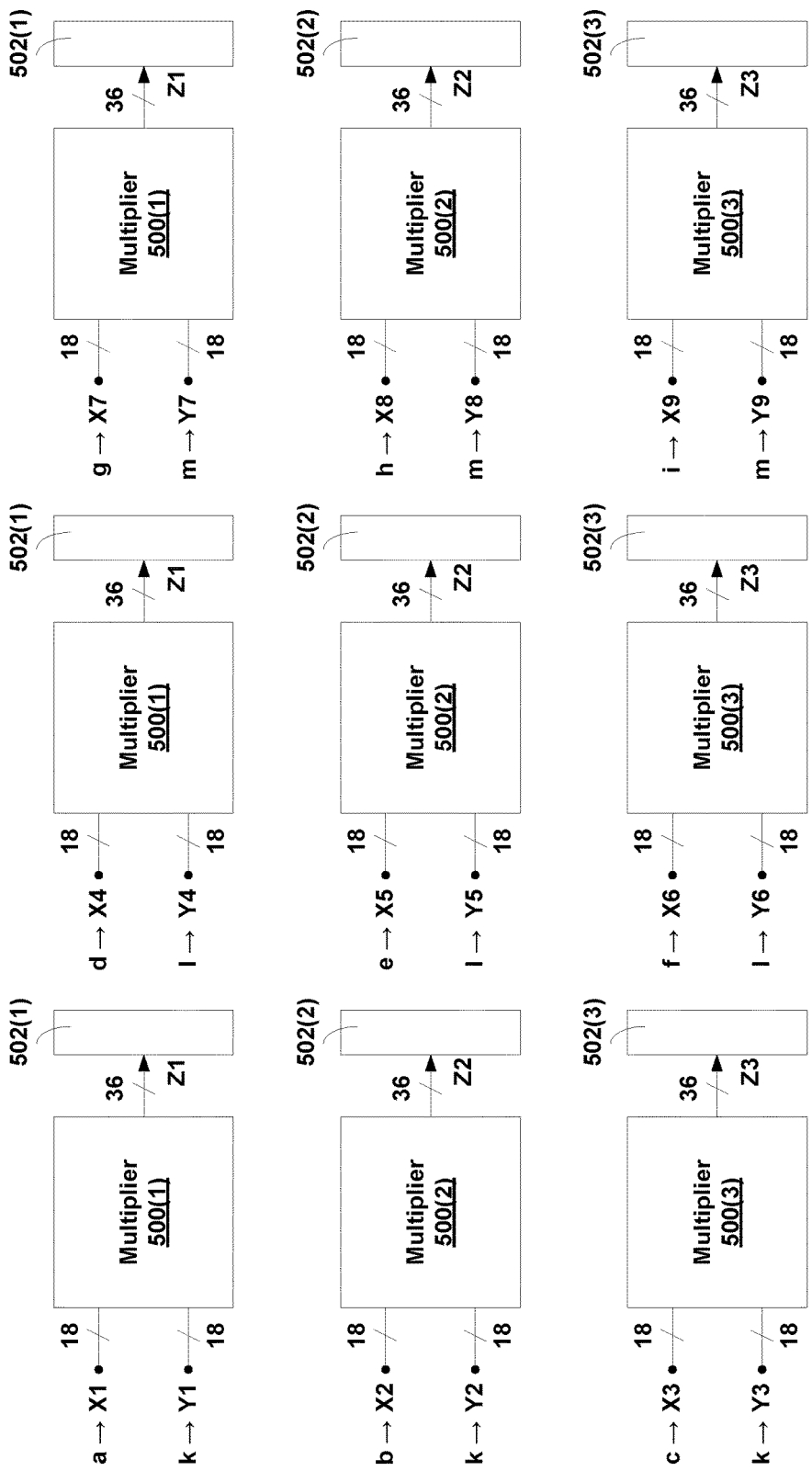

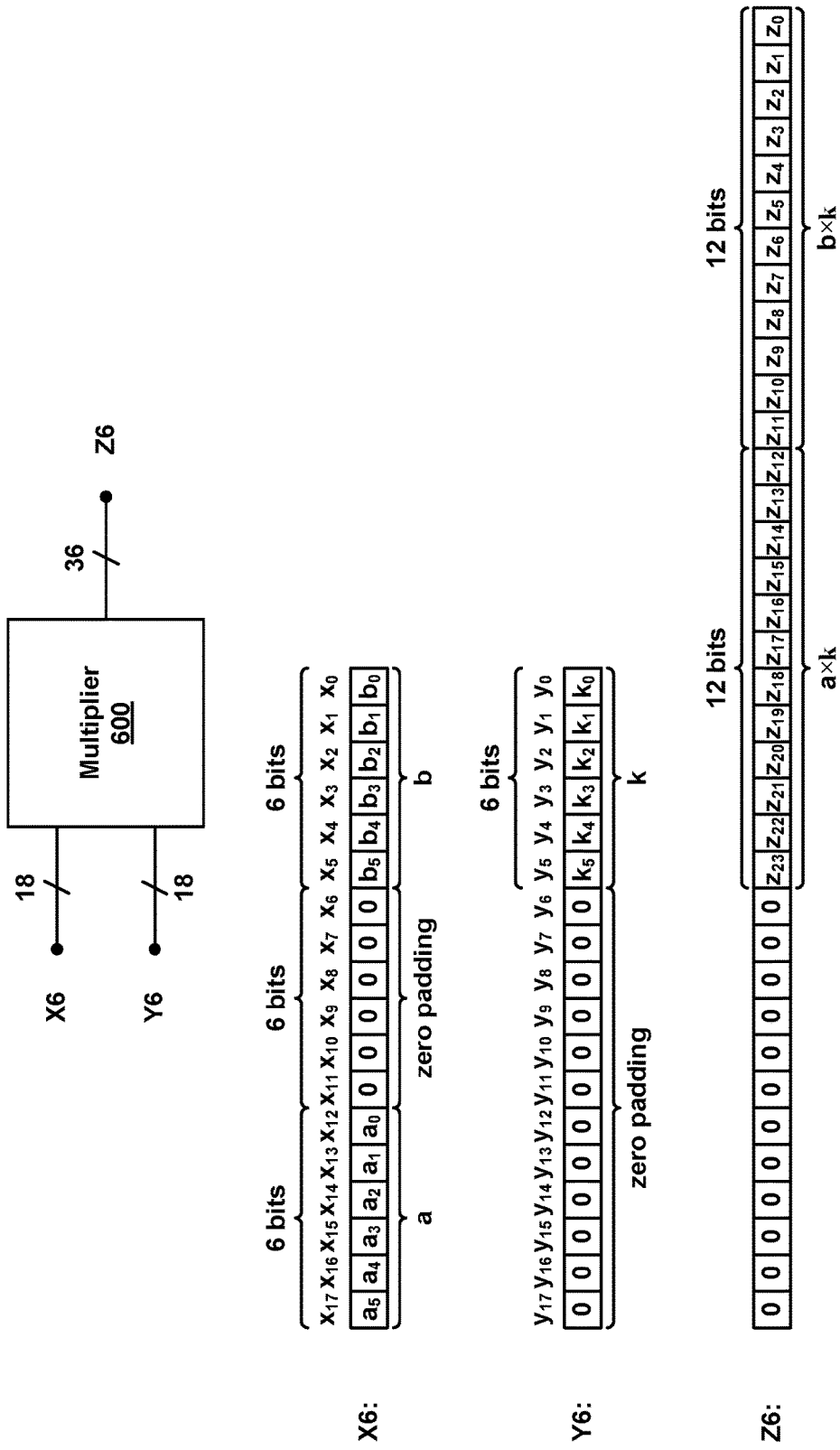

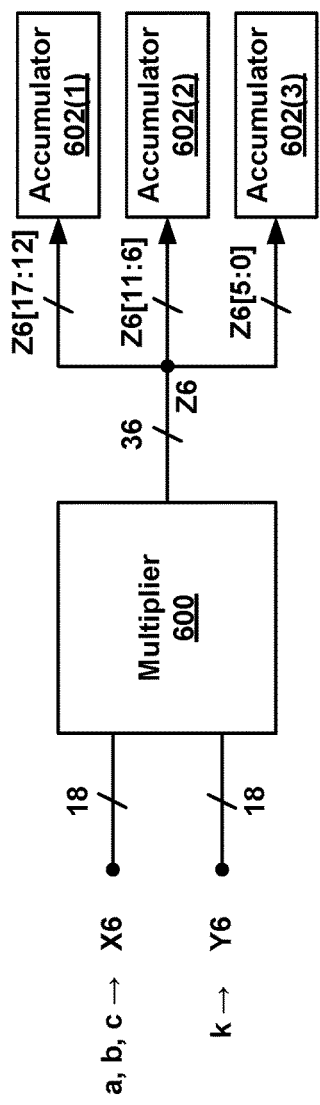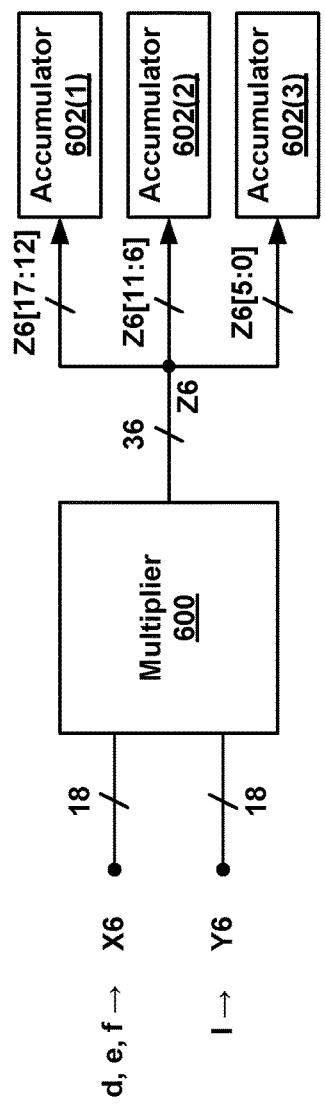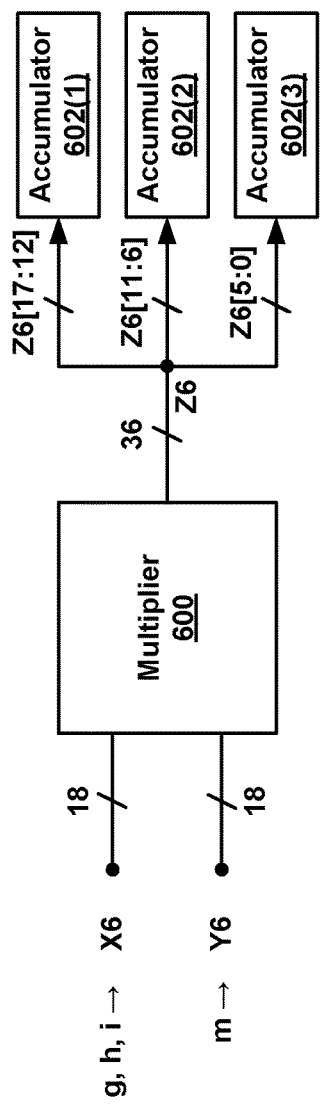

DATA PACKING TECHNIQUES FOR HARD-WIRED MULTIPLIER CIRCUITS

BACKGROUND

Machine learning algorithms, such as deep neural networks, are increasingly being used for many artificial intelligence applications, such as computer vision, speech recognition, and robotics. Implementing machine learning algorithms typically requires high computational complexity. Indeed, running machine learning algorithms on a general-purpose central processing unit (CPU) can be extremely expensive, and in some cases quite impractical. Accordingly, techniques that enable efficient processing of machine learning algorithms to improve energy-efficiency and throughput are highly desirable.

Hardware acceleration components, such as field programmable gate arrays, have been used to supplement the processing performance of general-purpose CPUs for implementing machine learning algorithms.

SUMMARY

According to a first aspect, a method is provided that includes providing a hard-wired integer multiplier circuit configured to multiply a first physical operand and a second physical operand, mapping a first logical operand to a first portion of the first physical operand, mapping a second logical operand to a second portion of the first physical operand, and mapping a third logical operand to the second physical operand. The method further includes multiplying the first physical operand and the second physical operand using the hard-wired integer multiplier circuit to provide a multiplication result that includes a first portion including a product of the first logical operand and the third logical operand, and a second portion including a product of the second logical operand and the third logical operand.

According to a second aspect, an apparatus is provided that includes a processor and a hard-wired integer multiplier circuit configured to multiply a first physical operand and a second physical operand. The processor is configured to map a first logical operand to a first portion of the first physical operand, map a second logical operand to a second portion of the first physical operand, and map a third logical operand to the second physical operand, and multiply the first physical operand and the second physical operand using the hard-wired integer multiplier circuit to provide a multiplication result that includes a first portion including a product of the first logical operand and the third logical operand, and a second portion including a product of the second logical operand and the third logical operand.

According to a third aspect, a method is provided that includes providing a hard-wired integer multiplier circuit configured to multiply a first physical operand and a second physical operand, converting a first logical operand, a second logical operand and a third logical operand from two's complement representation to sign magnitude representation, removing a first sign bit from the first logical operand, a second sign bit from the second logical operand, and third sign bit from the third logical operand, mapping the first logical operand to a first portion of the first physical operand, mapping the second logical operand to a second portion of the first physical operand, and mapping a third logical operand to the second physical operand, multiplying the first physical operand and the second physical operand using the hard-wired integer multiplier circuit to provide a multiplication result that includes a first portion including a product of the first logical operand and the third logical operand, and a second portion including a product of the second logical operand and the third logical operand, extracting the first portion of the multiplication result and the second portion of the multiplication result, creating a sign-extended first portion of the multiplication result by adding a sign bit to the extracted first portion of the multiplication result based on the first sign bit and the third sign bit, and creating a sign-extended second portion of the multiplication result by adding a sign bit to the extracted second portion of the multiplication result based on the second sign bit and the third sign bit, and converting the sign-extended first portion of the multiplication result to two's complement representation and converting the sign-extended second portion of the multiplication result to two's complement representation.

The above-summarized functionality can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 5A-5C are block diagrams depicting multiplier blocks and accumulators used to implement matrix vector multiplication.

FIGS. 6A-6H are block diagrams depicting implementations of data packing multiplication techniques.

The same numbers are used throughout the disclosure and figures to reference like components and features. Series 100 numbers refer to features originally found in FIG. 1, series 300 numbers refer to features originally found in FIG. 2, series 400 numbers refer to features originally found in FIG. 3, and so on.

DETAILED DESCRIPTION

Machine learning algorithms, such as deep neural networks, perform numerous mathematical operations. Indeed, by some estimates, more than 99% of the arithmetic operations performed when implementing a deep neural network consist of multiplies/accumulates for matrix-vector multiplication. Although such mathematical operations can be performed by a general-purpose CPU, the computation rate for machine learning algorithms often exceeds the capabilities of even the fastest general-purpose CPU.

For improved processing performance, a hardware acceleration component, such as a field programmable gate array (FPGA) or other reconfigurable logic device, can be used to perform multiplies/accumulates for matrix-vector multiplication. Indeed, contemporary FPGA devices typically include very large numbers of hard-wired integer multiplier circuits (sometimes referred to as "multiplier blocks" or "DSP blocks") that can be used to perform integer multiplies/accumulates for matrix-vector multiplication.

Figure 1:
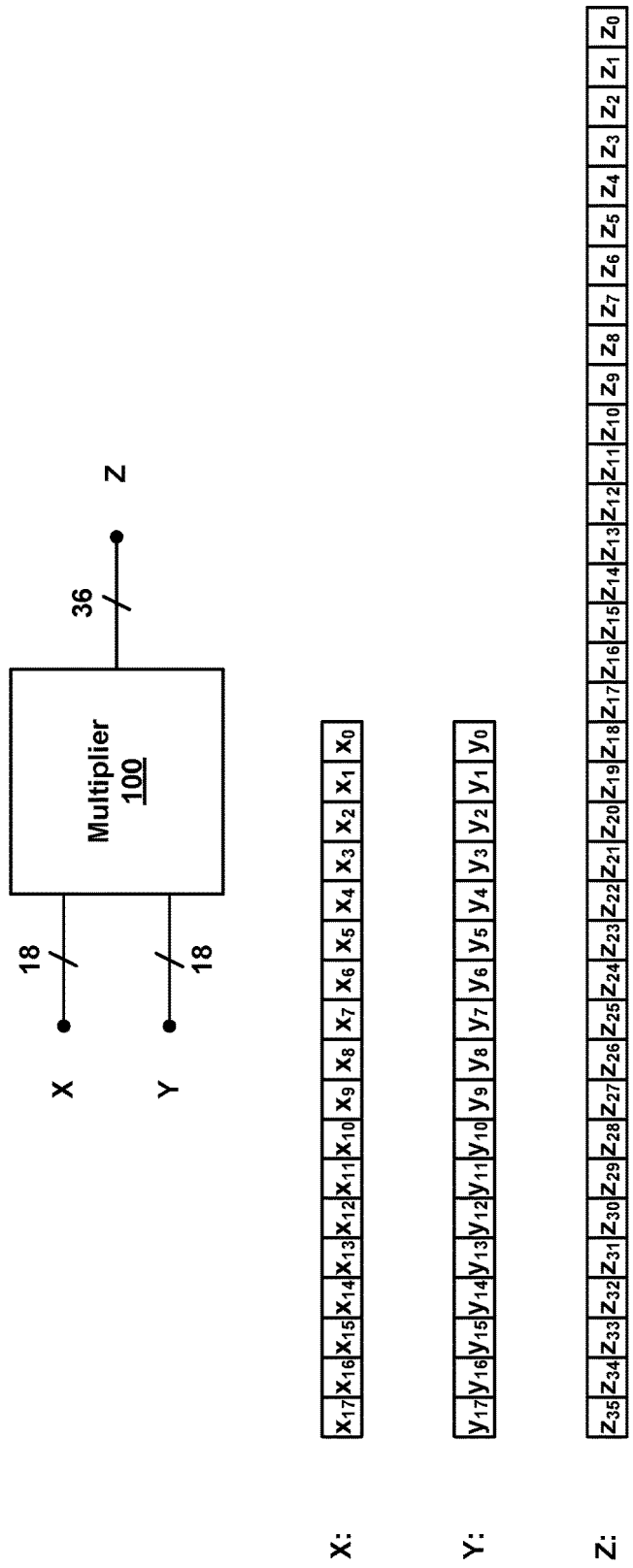
FIG. 1 is a block diagram of an example multiplier block on a field programmable gate array.

For example, an FPGA device may include 18×18 multiplier blocks that each have two inputs (referred to herein as a first physical operand and a second physical operand) and a single output. FIG. 1 is a simplified block diagram of an example 18×18 multiplier block 100 that includes a first physical operand X, a second physical operand Y, and an output Z. First physical operand X has an 18-bit width and includes bits $x_0, x_1, \ldots, x_{17}$, second physical operand Y has an 18-bit width and includes bits $y_0, y_1, \ldots, y_{17}$, and output Z has a 36-bit width and includes bits $z_0, z_1, \ldots, z_{35}$.

The bit widths of first physical operand X, second physical operand Y, and output Z are referred to herein as native bit width. Some FPGA devices have multiplier blocks that can be configured to varying native bit widths. For example, some multiplier blocks can be configured to operate in a first mode (e.g., as an 9×9 multiplier), a second mode (e.g., as an 18×18 multiplier), and a third mode (e.g., as a 27×27 multiplier).

Although some FPGAs have variable prevision multiplier blocks, the native bit widths of multiplier blocks in FPGAs exceeds the required precision for some machine learning algorithms. Indeed, recent research has shown that deep neural networks can be implemented using low numerical precision (e.g., as low as two bits) at minimal or no losses to model accuracy.

As described in more detail below, technology is described for using data packing techniques for hard-wired multiplier circuits in configurable logic devices, such as FPGAs. Without wanting to be bound by any particular theory, it is believed that such data packing techniques may increase a number of simultaneous multiplication operations that may be performed on each hard-wired multiplier circuit. In addition, without wanting to be bound by any particular theory, it is believed that such data packing techniques may improve processing speed and throughput of machine learning algorithms, such as deep neural networks using relatively low numerical precision.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof.

In one case, the illustrated separation of various components in the figures into distinct units may reflect the use of corresponding distinct physical and tangible components in an actual implementation. Alternatively, or in addition, any single component illustrated in the figures may be implemented by more than one actual physical component. Alternatively, or in addition, the depiction of any two or more separate components in the figures may reflect different functions performed by a single actual physical component.

Other figures describe concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into multiple component blocks, and certain blocks can be performed in an order that differs from that which is illustrated herein (including a parallel manner of performing the blocks). Blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional. That is, other features can be considered as optional, although not explicitly identified in the text. Further, any description of a single entity is not intended to preclude the use of more than one such entity. Similarly, a description of multiple entities is not intended to preclude the use of a single entity. Further, although the description may explain certain features as alternative ways of carrying out identified functions or implementing identified mechanisms, the features also can be combined together in any combination. Finally, the terms "exemplary" or "illustrative" refer to an implementation among potentially many implementations.

Figure 2:
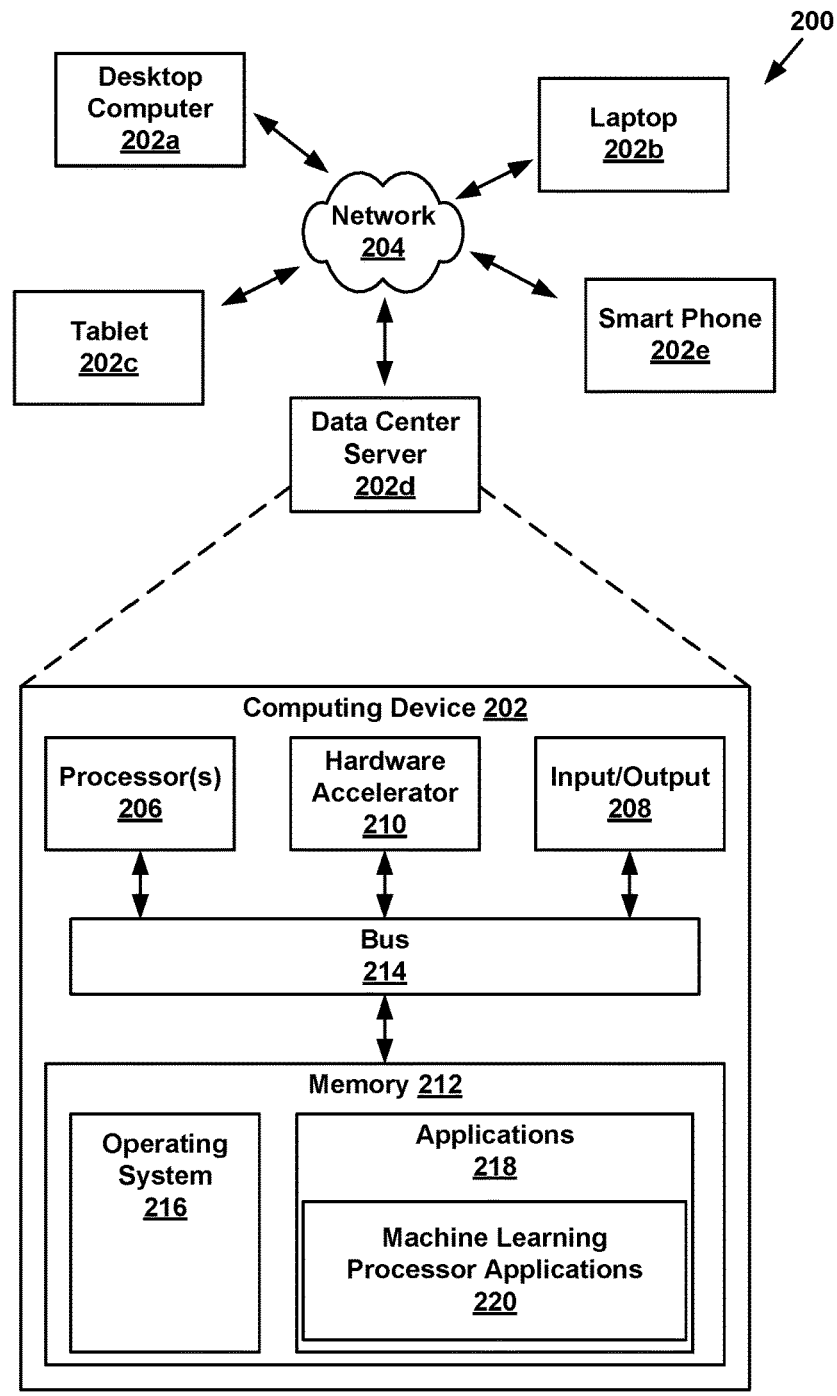
FIGS. 2-4 are block diagrams depicting example environments in which techniques described herein may be implemented.

FIG. 2 illustrates an example environment 200 in which example packed multiplier circuits, such as for use with machine learning algorithms, as described herein can operate. In some examples, the various devices and/or components of environment 200 include a variety of computing devices 202. By way of example and not limitation, computing devices 202 may include devices 202a-202e. Although illustrated as a diverse variety of device types, computing devices 202 can be other device types and are not limited to the illustrated device types. In some implementations any of a number of computing devices 202 may be interconnected via a network 204.

Network 204 can include, but is not limited to, a cellular network (e.g., wireless phone), a point-to-point dial up connection, a satellite network, the Internet, a local area network, a wide area network, a WiFi network, an ad hoc network, an intranet, an extranet, or a combination thereof. Network 204 may include one or more connected networks (e.g., a multi-network environment). Network 204 may include one or more data centers that store and/or process information (e.g., data) received from and/or transmitted to computing devices 202.

In an implementation, computing devices 202 can include any type of device with one or multiple processors 206 operably connected to an input/output interface 208, a hardware accelerator 210, and a memory 212, e.g., via a bus 214. Computing devices 202 can include personal computers such as, for example, desktop computers 202a, laptop computers 202b, tablet computers 202c, data center servers 202d (or servers is any other environment), smart phones 202e, electronic book readers, wearable computers, automotive computers, gaming devices, etc. In an implementation, computing devices 202 need not include processor 206, and may be a hardware appliance.

Computing devices 202 also can include other computing devices such as, for example, server computers, thin clients, terminals, and/or work stations. In some examples, computing devices 202 can include, for example, components for integration in a computing device, appliances, or other sorts of devices.

In some examples, some or all of the functionality described as being performed by computing devices 202 may be implemented by one or more remote peer computing devices, a remote server or servers, or a cloud computing resource. In some examples, a computing device 202 may include an input port to receive an input data sequence. Computing device 202 may further include one or multiple processors 206 to perform machine learning processing, for example.

In some examples, as shown regarding device 202d, memory 212 can store instructions executable by the processor(s) 206 including an operating system 216, and programs or applications 218 that are loadable and executable by processor(s) 206. Applications 218 may include machine learning processor applications 220 that may be executed to operate hardware accelerator 210, for example. The one or more processors 206 may include one or more central processing units (CPUs), graphics processing units (GPUs), video buffer processors, and so on.

In some implementations, machine learning processor applications 220 include executable code stored in memory 212 and executable by processor(s) 206 to receive and implement machine learning algorithms that include data sequences (e.g., streaming data or data files), locally or remotely by computing device 202, via input/output interface 208. In some examples, the data sequences may be associated with one or more applications 218. Machine learning processor applications 220 may operate in combination with hardware accelerator 210 to apply any of a number of processes, such as packed multiplier operators, used to process data stored in memory 212 or received via input/output interface 208.

Although certain blocks have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic circuits. For example, and without limitation, illustrative types of hardware logic circuits that can be used include an FPGA device, an application-specific integrated circuit (ASIC) device, a GPU, a massively parallel processor array (MPPA) device, an application-specific standard product (ASSP) device, a system-on-a-chip device (SOC) device, a complex programmable logic device (CPLD), a custom integrated circuit, etc.

For example, all or a portion of hardware accelerator 210 may be implemented on one or more FPGAs, ASICs, GPUs, MPPAs, ASSPs, SOCs, CPLDs, and/or custom integrated circuits. The term "hardware" accelerator broadly encompasses different ways of leveraging a hardware device to perform a function, including, for instance, at least: a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run on MPPAs of soft processors or the like; e) a case in which at least some tasks run as software on hard ASIC processors or the like, and so on, or any combination thereof.

The following explanation will present a primary example in which hardware accelerators, such as hardware accelerator 210, correspond to one or more FPGA devices, although, as noted, hardware accelerators may be constructed using other types of hardware logic circuits.

Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, memory 212 is an example of computer storage media storing computer-executable instructions.

In various examples, an input device of input/output interface 208 can be a direct-touch input device (e.g., a touch screen), an indirect-touch device (e.g., a touch pad), an indirect input device (e.g., a mouse, keyboard, a camera or camera array, etc.), or another type of non-tactile device, such as an audio input device.

Computing device(s) 202 also may include one or more input/output interfaces 208 to allow computing device 202 to communicate with other devices. Input/output interface 208 can include one or more network interfaces to enable communications between computing device 202 and other networked devices such as other device(s) 202. Input/output interface 208 can allow a computing device 202 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 3:
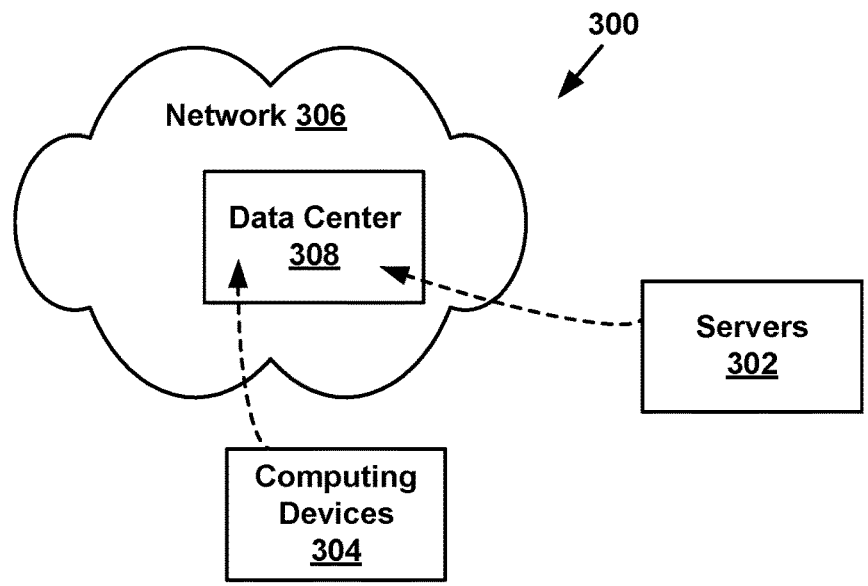

FIG. 3 is a block diagram depicting an example system 300 that includes any number of servers 302 and computing devices 304 in communication with a network 306. At least a portion of servers 302 and/or computing devices 304 are located in one or more data centers 308, as indicated by the dashed arrows. Such communication, for example, may involve transmitting and/or receiving data among servers 302, computing devices 304, and data center 308 via network 306 at relatively fast network rates. For example, data received in data center 308 may include network data traffic via the Internet (e.g., network 306), for example. Such data may be received by the data center at network speeds that exceed 10 Gb/sec, for example.

Individual servers 302 and computing devices 304, for example, may be the same as or similar to computing device 202 described above and illustrated in FIG. 2. Network 306 may the same as or similar to network 204, for example, described in FIG. 2. In some examples, data center 308 is a facility used to house computer systems and associated components, such as telecommunications and storage systems. Such a data center may include, among other things, redundant or backup power supplies, redundant data communications connections, environmental controls (e.g., air conditioning, fire suppression), and various security devices. Data centers may involve industrial-scale operations and relatively large amount of electrical power for supporting operations.

Figure 4:
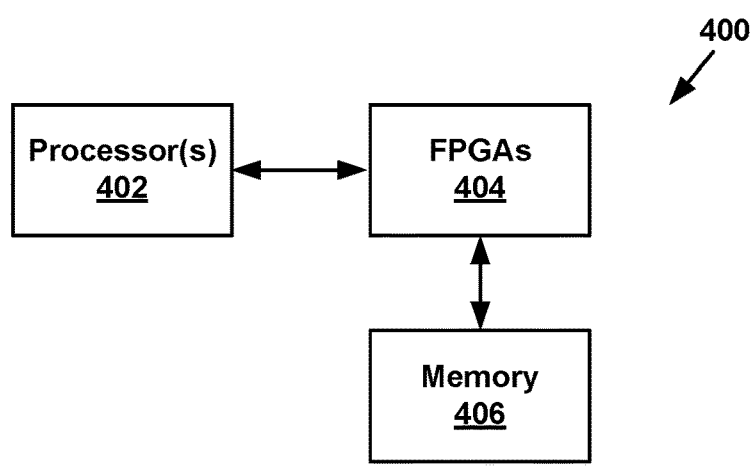

FIG. 4 is a block diagram depicting an example system 400 that includes any number of processors 402 and FPGAs 404. System 400, which may be incorporated in a data center (e.g., data center 308 of FIG. 2) for example, may be similar to or the same as computing device 202 described above and illustrated in FIG. 2. System 400 may be configured to implement machine learning algorithms that are received into the data center or transmitted from the data center. In some implementations, such data may be transmitted through FPGAs 404, for example. FPGAs 404 may directly communicate with memory 406, which may store data during machine learning processing performed with FPGAs 404.

In some examples, FPGAs 404 may be the same as or similar to hardware accelerator 210 described above and illustrated in FIG. 2. In various implementations, system 400 may include any number of ASICs, GPUs, MPPAs, ASSPs, SOCs, CPLDs, custom integrated circuits, or a combination thereof, in addition to or in place of FPGAs 404. In other words, for example, machine learning processor applications that perform packed multiplier operations described herein may be implemented using any of a number of hardware configurations, such as those listed above.

As described above, machine learning algorithms typically perform numerous matrix-vector multiplication operations. An example of a simple matrix-vector multiplication operation A×v=o is shown below:

$$\begin{bmatrix} a & d & g \\ b & e & h \\ c & f & i \end{bmatrix} \times \begin{bmatrix} k \\ l \\ m \end{bmatrix} = \begin{bmatrix} o1 \\ o2 \\ o3 \end{bmatrix} \qquad (1)$$

In this example, a 3×3 matrix A is multiplied by a 3-dimensional vector v, and the result is a 3-dimensional output vector o having elements o1, o2 and o3. Elements o1, o2 and o3 can be written as:

$$o1 = (a \times k) + (d \times l) + (g \times m) \qquad (2)$$

$$o2 = (b \times k) + (e \times l) + (h \times m) \qquad (3)$$

$$o3 = (c \times k) + (f \times l) + (i \times m) \qquad (4)$$

Thus, this example matrix-vector multiplication includes nine multiplications: (a×k), (b×k), (c×k), (d×l), (e×l), (f×l), (g×m), (h×m) and (i×m). In a conventional FPGA implementation, three separate multiplier blocks (e.g., three separate 18×18 multiplier blocks) may be used to perform these nine multiplications.

For example, FIGS. 5A-5C are block diagrams depicting an implementation of three separate 18×18 multiplier blocks 500(1)-500(3) (e.g., each identical to multiplier block 100 of FIG. 1) coupled to corresponding accumulators 502(1)-502(3), respectively, used to implement the matrix vector multiplication of Equations (2)-(3), above.

In an implementation, multiplier block 500(1) has a first physical operand X1, a second physical operand Y1, and provides a multiplication result Z1 that is coupled to an input of an accumulator 502(1). Multiplier block 500(2) has a first physical operand X2, a second physical operand Y2, and provides a multiplication result Z2 that is coupled to an input of an accumulator 502(2). Multiplier block 500(3) has a first physical operand X3, a second physical operand Y3, and provides a multiplication result Z3 that is coupled to an input of an accumulator 502(3).

FIGS. 5A-5C depict the operation of multiplier blocks 500(1)-500(3) and corresponding accumulators 502(1)-502(3), respectively, at three separate time instants to implement the matrix vector multiplication of Equations (2)-(3), above. In FIG. 5A, at a first time instant, (a) a logical operand (a) and a logical operand (k) are mapped to first physical operand X1 and second physical operand Y1, respectively, of multiplier block 500(1) to produce a multiplication result Z1=(a×k), which is coupled as an input to accumulator 502(1);

(b) a logical operand (b) and a logical operand (k) are mapped to first physical operand X2 and second physical operand Y2, respectively, of multiplier block 500(2) to produce an output Z2=(b×k), which is coupled as an input to accumulator 502(2); and (c) a logical operand (c) and a logical operand (k) are mapped to first physical operand X3 and second physical operand Y3, respectively, of multiplier block 500(3) to produce an output Z3=(c×k), which is coupled as an input to accumulator 502(3).

At the completion of the multiply-accumulate operation of FIG. 5A, accumulators 502(1), 502(2) and 502(3) have values (a×k), (b×k), and (c×k), respectively.

In FIG. 5B, at a second time instant after the first time instant, (a) a logical operand (d) and a logical operand (l) are mapped to first physical operand X1 and second physical operand Y1, respectively, of multiplier block 500(1) to produce a multiplication result Z1=(d×l), which is coupled as an input to accumulator 502(1);

(b) a logical operand (e) and a logical operand (l) are mapped to first physical operand X2 and second physical operand Y2, respectively, of multiplier block 500(2) to produce an output Z2=(e×l), which is coupled as an input to accumulator 502(2); and (c) a logical operand (f) and a logical operand (l) are mapped to first physical operand X3 and second physical operand Y3, respectively, of multiplier block 500(3) to produce an output Z3=(f×l), which is coupled as an input to accumulator 502(3).

At the completion of the multiply-accumulate operation of FIG. 5B, accumulators 502(1), 502(2) and 502(3) have values (a×k)+(d×l), (b×k)+(e×l), and (c×k)+(f×l), respectively.

In FIG. 5C, at a third time instant after the second time instant, (a) a logical operand (g) and a logical operand (m) are mapped to first physical operand X1 and second physical operand Y1, respectively, of multiplier block 500(1) to produce a multiplication result Z1=(g× m), which is coupled as an input to accumulator 502(1);

(b) a logical operand (h) and a logical operand (m) are mapped to first physical operand X2 and second physical operand Y2, respectively, of multiplier block 500(2) to produce an output Z2=(h×m), which is coupled as an input to accumulator 502(2); and (c) a logical operand (i) and a logical operand (m) are mapped to first physical operand X3 and second physical operand Y3, respectively, of multiplier block 500(3) to produce an output Z3=(i×m), which is coupled as an input to accumulator 502(3).

At the completion of the multiply-accumulate operation of FIG. 5C, accumulators 502(1), 502(2) and 502(3) have values (a×k)+(d×l)+(g×m), (b×k)+(e×l)+(h×m), and (c×k)+(f×l)+(i×m), respectively. Thus, accumulators 502(1), 502(2) and 502(3) have the values o1, o2 and o3, respectively, of Equations (2)-(4), above.

If the elements a, b, . . . , i of matrix A and the elements k, l, m of vector v each have a bit width less than the native bit width of the multiplier block, data packing multiplication techniques may be used to reduce the number of separate multiplier blocks needed to perform the various multiplications described above. FIGS. 6A-6H depict various implementations of data packing multiplication techniques.

For example, FIG. 6A is a diagram illustrating an implementation of a data packing multiplication operation using an 18×18 multiplier block 600 (e.g., identical to multiplier block 100 of FIG. 1) that includes a first physical operand X6, a second physical operand Y6, and an output Z6. First physical operand X6 has an 18-bit width, second physical operand Y6 has an 18-bit width, and output Z6 has a 36-bit width.

In an implementation, multiplier block 600 may be used to perform the multiplications (a×k) and (b×k), with elements a, b and k each having six bit precision, as follows:

(i) a first logical operand (b) having a bit width R=6 (bits $b_0, b_1, \ldots, b_5$) is mapped to a first portion of first physical operand X6 (e.g., the R=6 least significant bits $x_0, x_1, \ldots, x_5$ of first physical operand X6);

(ii) a second logical operand (a) having a bit width S=6 (bits $a_0, a_1, \ldots, a_5$) is mapped to a second portion of first physical operand X6 (e.g., the S=6 most significant bits $x_{12}, x_{13}, \ldots, x_{17}$ of first physical operand X6);

(iii) T=6 zero padding bits are added to a third portion of first physical operand X6, between the first portion and the second portion of first physical operand X6 (e.g., T=6 bits $x_6, x_7, \ldots, x_{11}$ of first physical operand X6);

(iv) a third logical operand (k) having a bit width U=6 (bits $k_0, k_1, \ldots, k_5$) is mapped to a first portion of second physical operand Y6 (e.g., the U=6 least significant bits $y_0, y_1, \ldots, y_5$ of second physical operand Y6); and (v) the remaining V=12 most significant bits are zero padded to form a second portion of second physical operand Y6 (e.g., V=12 bits $y_6, y_7, \ldots, x_{17}$ of second physical operand Y6).

Steps (i)-(v) may be performed by a processor, such as a processor implemented in hardware accelerator 210 of FIG. 2, or other processor.

Multiplier block 600 is then used to multiply the first physical operand by the second physical operand, and produce a result Z6. A first portion of result Z6 represents the product (b×k), and a second portion of result Z6 represents the product (a×k). In particular, an (R+U)=12 least significant bits $z_0, z_1, \ldots, z_{11}$ of result Z6 are the product (b×k), and an (S+U)=12 next most significant bits $z_{12}, z_{13}, \ldots, z_{23}$ of result Z6 are the product (a×k).

Thus, by mapping R=S=6-bit logical operands a and b to first physical operand X6, with T=6 zero padding bits inserted between the two mapped operands, and mapping U=6-bit logical operand k to second physical operand Y6, a single multiplier block may be used to simultaneously perform two separate multiplication operations. To prevent carries from the first product (b×k) from interfering with the result of the second product (a×k), the number T of zero padding bits inserted between the mapped logical operands a and b in the first physical operand X6 is equal to the maximum bit width of logical operands a, b and k (e.g., T=max (R, S, U)=6 bits).

Figure 6B:
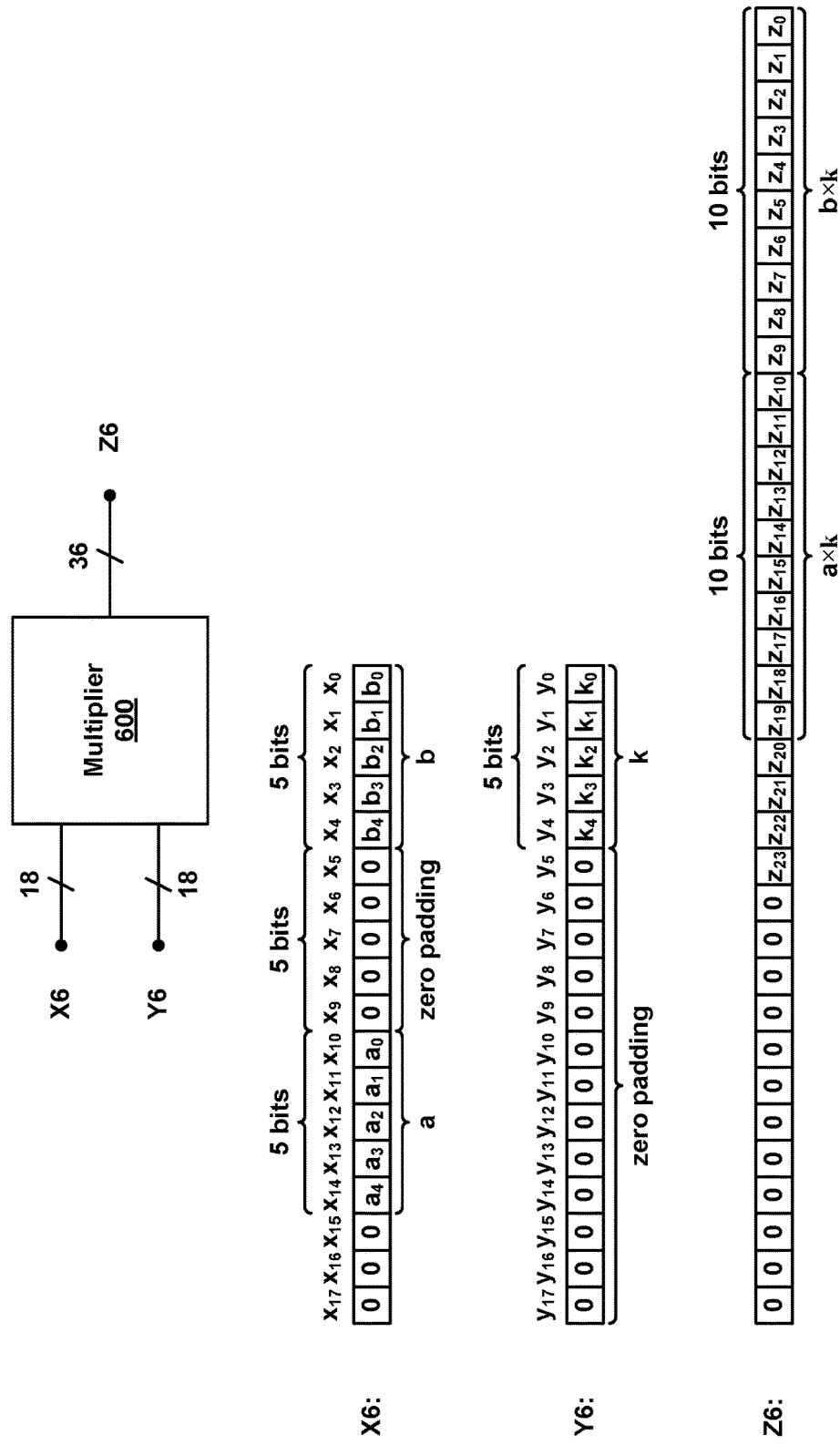

In the implementation depicted in FIG. 6A, each logical operand (a, b, k) has a bit width exactly one-third of the width of first physical operand X6 and second physical operand Y6. In other implementations, logical operands (a, b, k) may each have a bit width less than one-third of the width of first physical operand X6 and second physical operand Y6. For example, FIG. 6B illustrates an implementation of a data packing multiplication operation in which multiplier block 600 is used to perform the multiplications (a×k) and (b×k), with elements a, b and k each having five bit precision, as follows:

(i) a first logical operand (b) having a bit width R=5 (bits $b_0, b_1, \ldots, b_4$) is mapped to a first portion of first physical operand X6 (e.g., the R=5 least significant bits $x_0, x_1, \ldots, x_4$ of first physical operand X6);

(ii) a second logical operand (a) having a bit width S=5 (bits $a_0, a_1, \ldots, a_4$) is mapped to a second portion of first physical operand X6 (e.g., S=5 bits $x_{10}, x_{11}, \ldots, x_{14}$ of first physical operand X6);

(iii) T=5 zero padding bits are added to a third portion of first physical operand X6, between the first portion and the second portion of first physical operand X6 (e.g., T=5 bits $x_5, x_6, \ldots, x_9$ of first physical operand X6);

(iv) a third logical operand (k) having a bit width U=5 (bits $k_0, k_1, \ldots, k_4$) is mapped to a first portion of second physical operand Y6 (e.g., the U=5 least significant bits $y_0, y_1, \ldots, y_4$ of second physical operand Y6); and (v) the remaining V=13 most significant bits are zero padded to form a second portion of second physical operand Y6 (e.g., V=13 bits $y_5, y_6, \ldots, x_{17}$ of second physical operand Y6).

Steps (i)-(v) may be performed by a processor, such as a processor implemented in hardware accelerator 210 of FIG. 2, or other processor.

Multiplier block 600 is then used to multiply the first physical operand by the second physical operand, and produce a result Z6. A first portion of result Z6 represents the product (b×k), and a second portion of result Z6 represents the product (a×k). In particular, an (R+U)=10 least significant bits $z_0, z_1, \ldots, z_9$ of result Z6 are the product (b×k), and an (S+U)=10 next most significant bits $z_{10}, z_{11}, \ldots, z_{19}$ of result Z6 are the product (a×k). As in the previous implementation, to prevent carries from the first product (b×k) from interfering with the result of the second product (a×k), the number T zero padding bits inserted between the mapped logical operands a and b in the first physical operand X6 is equal to the maximum bit width of logical operands a, b and k (e.g., T=max (R, S, U)=5 bits).

Figure 6C:
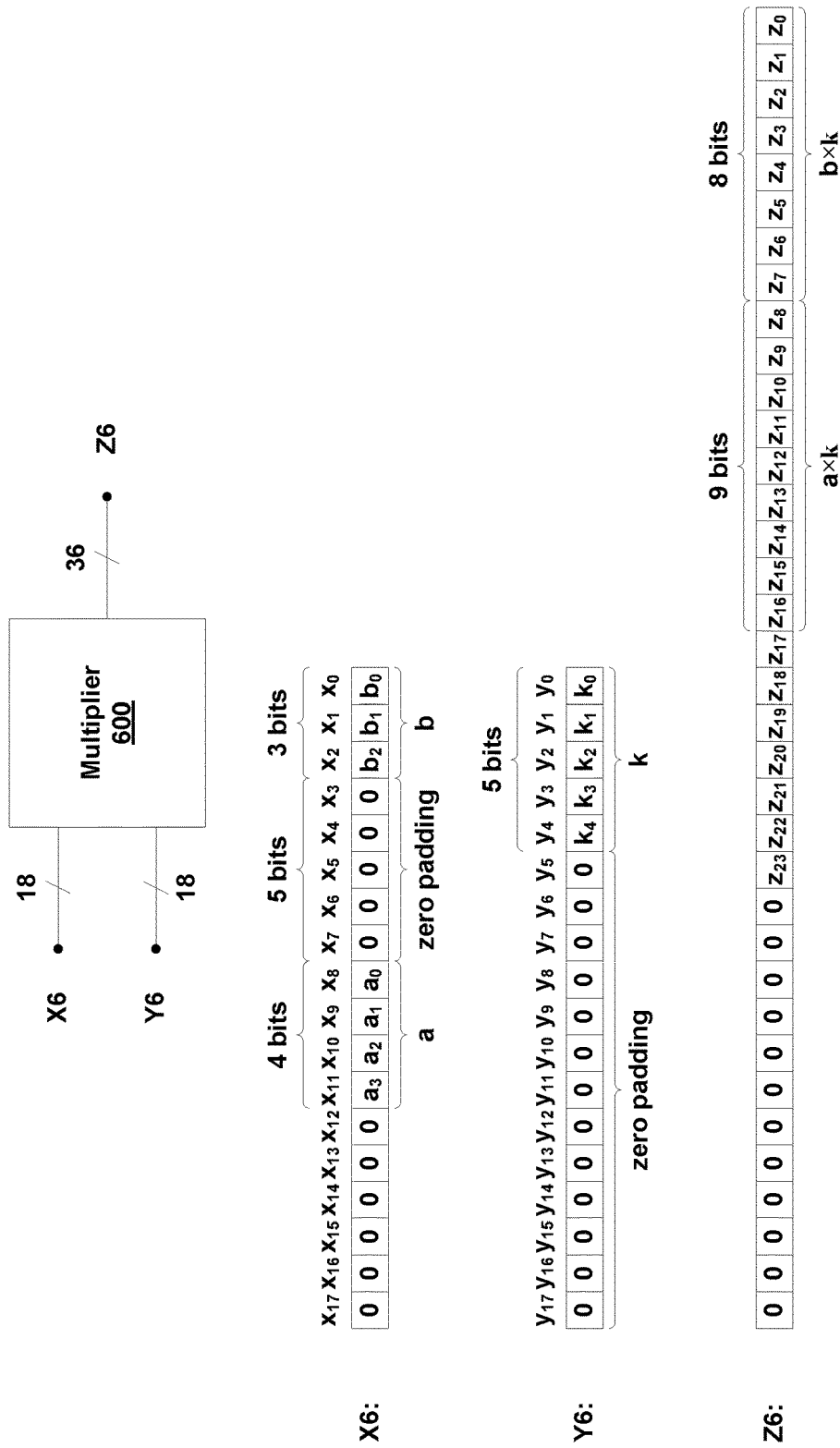

In the implementations depicted in FIGS. 6A-6B, each logical operand (a, b, k) has the same width (i.e., R=S=U). In other implementations, logical operands (a, b, k) may have different widths. For example, FIG. 6C illustrates an implementation of a data packing multiplication operation in which multiplier block 600 is used to perform the multiplications (a×k) and (b×k), with elements a, b and k having different bit widths, as follows:

(i) a first logical operand (b) having a bit width R=3 (bits $b_0, b_1, b_2$) is mapped to a first portion of first physical operand X6 (e.g., the R=3 least significant bits $x_0, x_1, x_2$ of first physical operand X6);

(ii) a second logical operand (a) having a bit width S=4 (bits $a_0, a_1, \ldots, a_3$) is mapped to a second portion of first physical operand X6 (e.g., S=4 bits $x_8, x_9, \ldots, x_{11}$ of first physical operand X6);

(iii) T=5 zero padding bits are added to a third portion of first physical operand X6, between the first portion and the second portion of first physical operand X6 (e.g., T=5 bits $x_3, x_4, \ldots, x_7$ of first physical operand X6);

(iv) a third logical operand (k) having a bit width U=5 (bits $k_0, k_1, \ldots, k_4$) is mapped to a first portion of second physical operand Y6 (e.g., the U=5 least significant bits $y_0, y_1, \ldots, y_4$ of second physical operand Y6); and (v) the remaining V=13 most significant bits are zero padded to form a second portion of second physical operand Y6 (e.g., V=13 bits $y_5, y_6, \ldots, x_{17}$ of second physical operand Y6).

Steps (i)-(v) may be performed by a processor, such as a processor implemented in hardware accelerator 210 of FIG. 2, or other processor.

Multiplier block 600 is then used to multiply the first physical operand by the second physical operand, and produce a result Z6. A first portion of result Z6 represents the product (b×k), and a second portion of result Z6 represents the product (a×k). In particular, an (R+U)=8 least significant bits $z_0, z_1, \ldots, z_7$ of result Z6 are the product (b×k), and an (S+U)=9 next most significant bits $z_8, z_9, \ldots, z_{16}$ of result Z6 are the product (a×k). To prevent carries from the first product (b×k) from interfering with the result of the second product (a×k), the number T of zero padding bits inserted between the mapped logical operands a and b in the first physical operand X6 is equal to the maximum bit width of logical operands a, b and k (e.g., T=max (R, S, U)=5 bits).

Figure 6D:
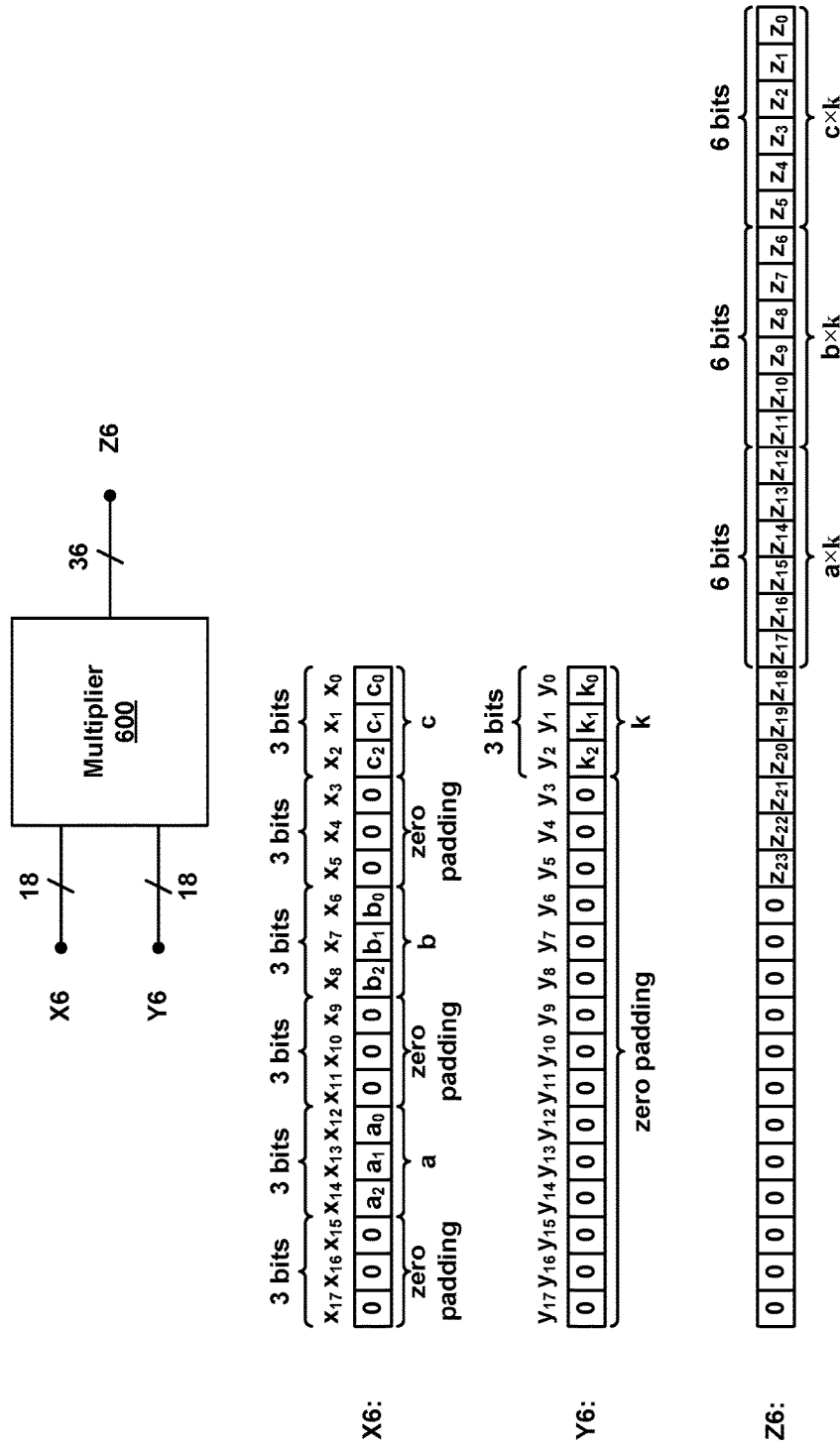

In the implementations depicted in FIGS. 6A-6C, two logical operands (a, b) are mapped to first physical operand X6. In other implementations, more than two logical operands may be mapped to first physical operand X6. For example, FIG. 6D illustrates an implementation of a data packing multiplication operation in which multiplier block 600 is used to perform the multiplications (a×k), (b×k) and (c×k), with elements a, b, c and k each having three bit precision, as follows:

(i) a first logical operand (c) having a bit width R=3 (bits $c_0, c_1, c_2$) is mapped to a first portion of first physical operand X6 (e.g., the R=3 least significant bits $x_0, x_1, x_2$ of first physical operand X6);

(ii) a second logical operand (b) having a bit width S=3 (bits $b_0, b_1, b_2$) is mapped to a second portion of first physical operand X6 (e.g., S=3 bits $x_6, x_7, x_8$ of first physical operand X6);

(iii) a third logical operand (a) having a bit width W=3 (bits $a_0, a_1, a_2$) is mapped to a third portion of first physical operand X6 (e.g., W=3 bits $x_{12}, x_{13}, x_{14}$ of first physical operand X6);

(iv) T=3 padding bits are added to each of fourth, fifth and sixth portions of first physical operand X6, between the first portion and the second portion of first physical operand X6 (e.g., T=3 bits $x_3, x_4, x_5$ of first physical operand X6), between the second portion and the third portion of first physical operand X6 (e.g., T=3 bits $x_9, x_{10}, x_{11}$ of first physical operand X6), and the T=3 most significant bits of first physical operand X6 (e.g., three bits $x_{15}, x_{16}, x_{17}$ of first physical operand X6);

(v) a fourth logical operand (k) having a bit width U=3 (bits $k_0, k_1, k_2$) is mapped to a first portion of second physical operand Y6 (e.g., the U=3 least significant bits $y_0, y_1, y_2$ of second physical operand Y6); and (vi) the remaining V=15 most significant bits are zero padded to form a second portion of second physical operand Y6 (e.g., fifteen bits $y_3, y_4, \ldots, x_{17}$ of second physical operand Y6).

Steps (i)-(vi) may be performed by a processor, such as a processor implemented in hardware accelerator 210 of FIG. 2, or other processor.

Multiplier block 600 is then used to multiply the first physical operand by the second physical operand, and produce a result Z6. A first portion of result Z6 represents the product (c×k), a second portion of result Z6 represents the product (b×k), and a third portion of result Z6 represents the product (a×k). In particular, an (R+U)=6 least significant bits $z_0, z_1, \ldots, z_5$ of result Z6 are the product (c×k), an (S+U)=6 next most significant bits $z_6, z_7, \ldots, z_{11}$ of result Z6 are the product (b×k), and a (W+U)=6 next most significant bits $z_{12}, z_{13}, \ldots, z_{17}$ of result Z6 are the product (a×k).

Thus, by mapping R=S=W=3-bit logical operands a, b and c to a single physical operand X6 of multiplier block 600, with T=3 zero padding bits between each of the three mapped operands, and mapping U=3-bit logical operand k to second physical operand Y6, a single multiplier block may be used to simultaneously perform three separate multiplication operations. To prevent carries from the first product (c×k) from interfering with the result of the second product (b×k), and to prevent carries from the second product (b×k) from interfering with the result of the second product (a×k), the number T of zero padding bits inserted between the mapped logical operands a and b and c and b in the first physical operand X6 is equal to the maximum bit width of logical operands a, b, c and k (e.g., T=max (R, S, W, U)=3 bits).

Figure 6E:
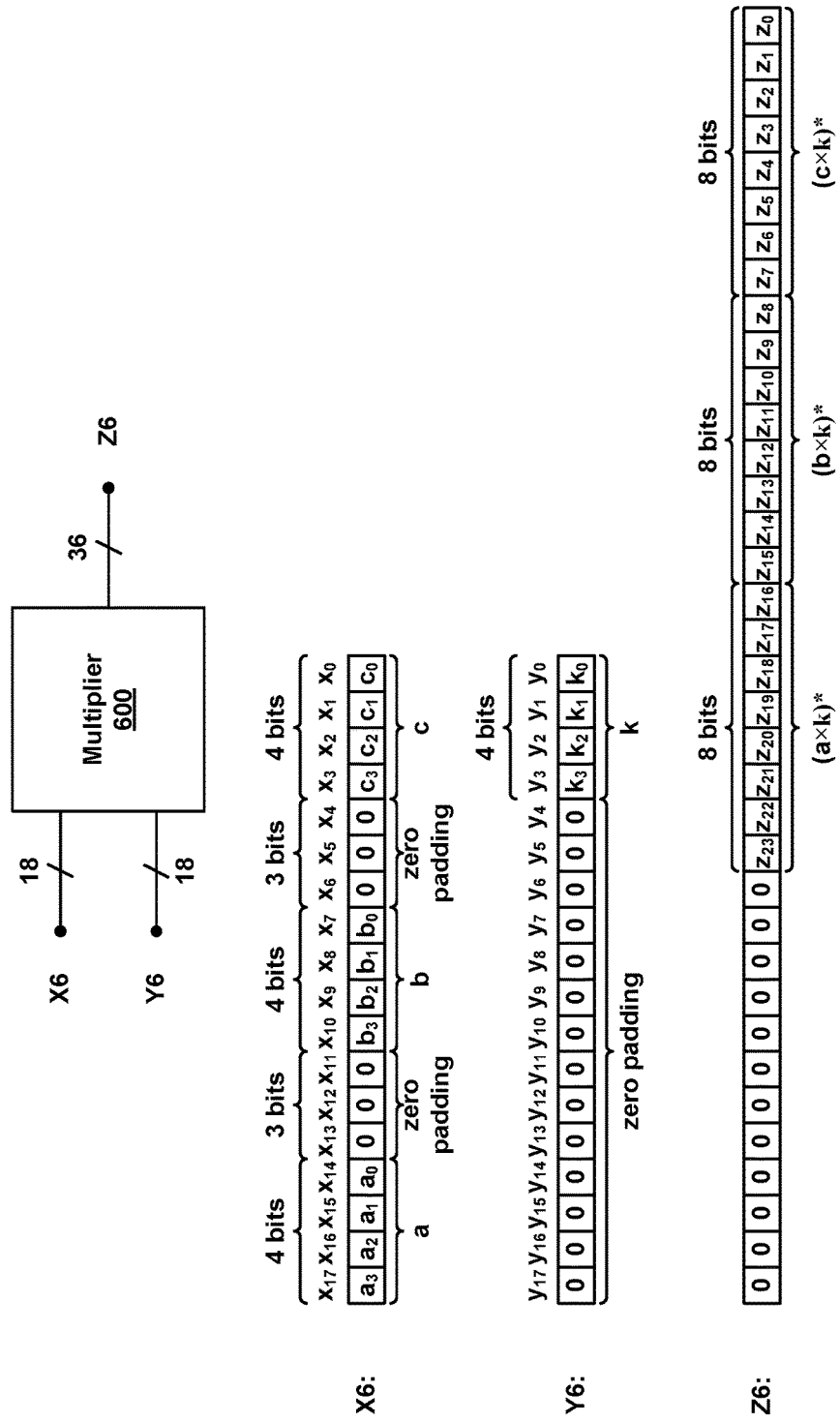

In the implementations depicted in FIGS. 6A-6D, the number T of zero-padding bits inserted between the mapped logical operands in the first physical operand X6 is equal to the maximum bit width of logical operands a, b, c and k (e.g., T=max (R, S, W, U)). In another implementation, the T number of zero-padding bits inserted between the mapped logical operands in the first physical operand X6 is less than the maximum bit width of logical operands a, b, c and k. For example, FIG. 6E illustrates an implementation of a data packing multiplication operation in which multiplier block 600 is used to perform the multiplications (a×k), (b×k) and (c×k), with elements a, b, c and k each having four bit precision, as follows:

(i) a first logical operand (c) having a bit width R=4 (bits $c_0, c_1, c_2, c_3$) is mapped to a first portion of first physical operand X6 (e.g., the R=4 least significant bits $x_0, x_1, x_2, x_3$ of first physical operand X6);

(ii) a second logical operand (b) having a bit width S=4 (bits $b_0, b_1, b_2, b_3$) is mapped to a second portion of first physical operand X6 (e.g., S=4 bits $x_7, x_8, x_9, x_{10}$ of first physical operand X6);

(iii) a third logical operand (a) having a bit width W=4 (bits $a_0, a_1, a_2, a_3$) is mapped to a third portion of first physical operand X6 (e.g., W=4 bits $x_{14}, x_{15}, x_{16}, x_{17}$ of first physical operand X6);

(iv) T=3 zero padding bits are added to each of fourth and fifth portions of first physical operand X6, between the first portion and the second portion of first physical operand X6 (e.g., T=3 bits $x_4, x_5, x_6$ of first physical operand X6), and between the second portion and the third portion of first physical operand X6 (e.g., T=3 bits $x_{11}$, $x_{12}$, $x_{13}$ of first physical operand X6);

(v) a fourth logical operand (k) having a bit width U=4 (having bits $k_0$, $k_1$, $k_2$, $k_3$) is mapped to a first portion of second physical operand Y6 (e.g., the U=4 least significant bits $y_0$, $y_1$, $y_2$, $y_3$ of second physical operand Y6); and (vi) the remaining V=14 most significant bits are zero padded to form a second portion of second physical operand Y6 (e.g., V=14 bits $y_4$, $y_5$, ..., $x_{17}$ of second physical operand Y6).

Steps (i)-(vi) may be performed by a processor, such as a processor implemented in hardware accelerator 210 of FIG. 2, or other processor.

Multiplier block 600 is then used to multiply the first physical operand by the second physical operand, and produce a result Z6. A first portion of result Z6 represents the product (c×k)*, a second portion of result Z6 represents the product (b×k)*, and a third portion of result Z6 represents the product (a×k)*. In particular, an (R+U)=8 least significant bits $z_0$, $z_1$, ..., $z_7$ of result Z6 are the product (c×k)*, an (S+U)=8 next most significant bits $z_8$, $z_9$, ..., $z_{15}$ of result Z6 are the product (b×k)*, and a (W+U)=8 next most significant bits $z_{16}$, $z_{17}$, ..., $z_{23}$ of result Z6 are the product (a×k)*.

Because the number T=3 zero padding bits inserted between the mapped logical operands a and b and c and b in the first physical operand X6 is less than the maximum bit width of logical operands a, b, c and k (e.g., four bits), carries from the first product (c×k)* may interfere with the result of the second product (b×k)*, and carries from the second product (b×k)* may interfere with the result of the second product. As a result, the products (c×k)*, (b×k)*, and (a×k)* of the implementation of FIG. 6E may not equal the products (c×k), (b×k), and (a×k), respectively, of the implementation of FIG. 6D.

However, because neural networks are inherently tolerant to noise, in some implementations the zero padding between operands may be reduced (such as in the implementation of FIG. 6E), potentially allowing carries between partial products to interfere, without significantly impacting accuracy. Thus, the number of multiplication results obtained from a single multiplier block may be increased by reducing zero padding between operands, in exchange for some sacrifice of neural network accuracy.

In an implementation, additional logic circuits (e.g., soft logic on an FPGA) may be used to process the output of data-packed multiplier blocks. For example, FIGS. 6FA-6H depict an implementations of a data packing multiplication operation of multiplier block 600 (e.g., identical to multiplier block 100 of FIG. 1) and accumulators 602(1)-602(3) at three separate time instants to implement the matrix vector multiplication of Equations (2)-(3), above, using three-bit matrix elements a-i and three bit vector elements k-m. Result Z6 of multiplier block 600 is coupled to accumulators 602(1)-602(3) as follows: bits z12-z17 of result Z6 are coupled to an input of accumulator 602(1), bits z6-z11 of result Z6 are coupled to an input of accumulator 602(2), and bits z0-z5 of result Z6 are coupled to an input of accumulator 602(3).

In FIG. 6F, at a first time instant, first logical operand (a), second logical operand (b) and third logical operand (c) are mapped to first physical operand X6, and fourth logical operand k is mapped to second physical operand Y6, such as described above in connection with FIG. 6D. Multiplier block 600 is then used to multiply the first physical operand by the second physical operand, and produce a result Z6. Bits $z_{12}$, $z_{13}$, ..., $z_{17}$ of result Z6 are the product (a×k) and are coupled to the input of accumulator 602(1), bits $z_6$, $z_7$, ..., $z_{11}$ of result Z6 are the product (b×k) and are coupled to the input of accumulator 602(2), and bits $z_0$, $z_1$, ..., $z_5$ of result Z6 are the product (c×k) and are input to accumulator 602(3). At the completion of the multiply-accumulate operation of FIG. 6F, accumulators 602(1), 602(2) and 602(3) have values (a×k), (b×k), and (c×k), respectively.

In FIG. 6G, at a second time instant after the first time instant, first logical operand d, second logical operand e and third logical operand f are mapped to first physical operand X6, and fourth logical operand 1 is mapped to second physical operand Y6, such as described above in connection with FIG. 6D. Multiplier block 600 is then used to multiply the first physical operand by the second physical operand, and produce a result Z6. Bits $z_{12}$, $z_{13}$, ..., $z_{17}$ of result Z6 are the product (d×l) and are coupled to the input of accumulator 602(1), bits $z_6$, $z_7$, ..., $z_{11}$ of result Z6 are the product (e×l) and are coupled to the input of accumulator 602(2), and bits $z_0$, $z_1$, ..., $z_5$ of result Z6 are the product (f×l) and are input to accumulator 602(3). At the completion of the multiply-accumulate operation of FIG. 6H, accumulators 602(1), 602(2) and 602(3) have values (a×k)+(d×l), (b×k)+(e×l), and (c×k)+(f×l), respectively.

In FIG. 6H, at a third time instant after the second time instant, first logical operand g, second logical operand h and third logical operand i are mapped to first physical operand X6, and fourth logical operand m is mapped to second physical operand Y6, such as described above in connection with FIG. 6D. Multiplier block 600 is then used to multiply the first physical operand by the second physical operand, and produce a result Z6. Bits $z_{12}$, $z_{13}$, ..., $z_{17}$ of result Z6 are the product (g× m) and are coupled to the input of accumulator 602(1), bits $z_6$, $z_7$, ..., $z_{11}$ of result Z6 are the product (h×m) and are coupled to the input of accumulator 602(2), and bits $z_0$, $z_1$, ..., $z_5$ of result Z6 are the product (i× m) and are input to accumulator 602(3). At the completion of the multiply-accumulate operation of FIG. 6H, accumulators 602(1), 602(2) and 602(3) have values (a×k)+(d×l)+(g× m), (b×k)+(e×l)+(h×m), and (c×k)+(f×l)+(i×m), respectively. Thus, accumulators 602(1), 602(2) and 602(3) have the values o1, o2 and o3, respectively, of Equations (2)-(4), above.

In the implementations of data packing multiplication operations described above and depicted in FIGS. 6A-6H, multiplier block 600 is an 18×18 multiplier block including a first physical operand having an 18-bit width, a second physical operand having an 18-bit width, and an output having a 36-bit width. In other implementations, multiplier blocks may be used that have other native bit widths, such as 9×9 multiplier blocks, 27×27 multiplier blocks, etc. In addition, other implementations, multiplier blocks may be used in which the first physical operand has a first bit width, and the second physical operand has a second bit width different from the first bit width (e.g., 36×187 multiplier blocks, etc.).

In the implementations of data packing multiplication operations described above, the matrix elements a-i and vector elements k-m have been assumed to be positive integers. The techniques described above can be used to multiply positive and negative numbers, but the sign bit for each element are handled separately from the multiplication operation.

Figure 7:
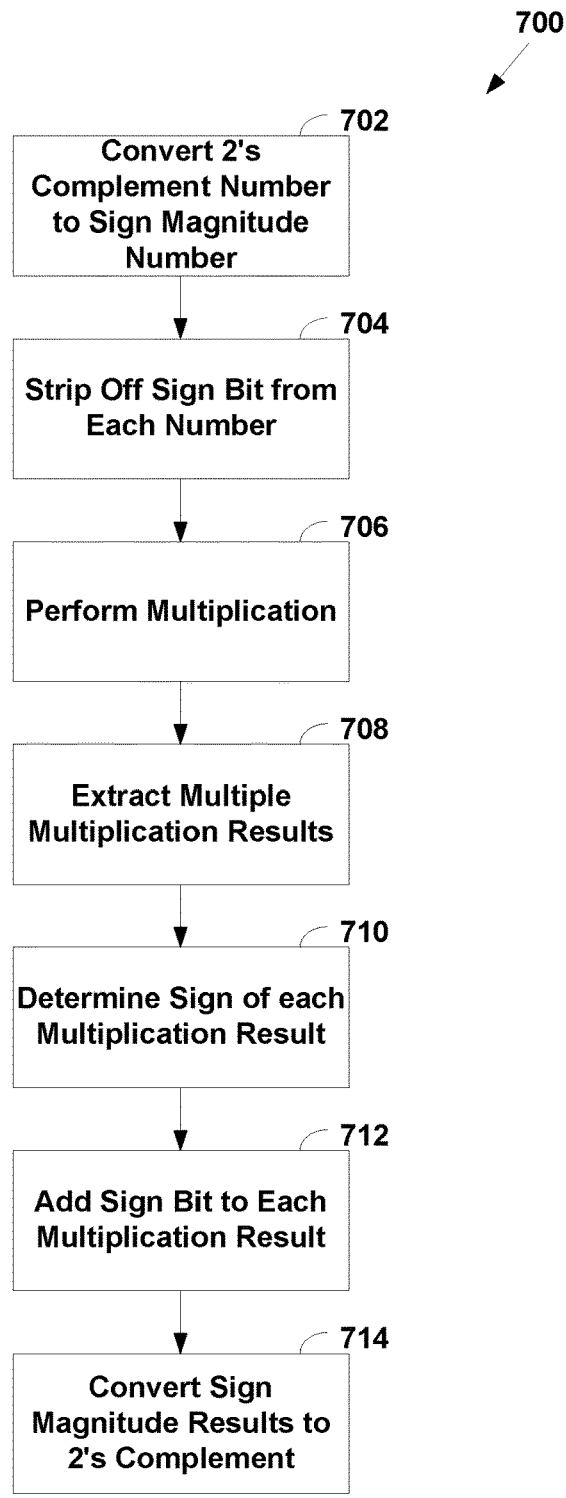
FIG. 7 is a flowchart that shows one manner of multiplying signed numbers using the example data packing multiplication techniques of FIGS. 6A-6H.

FIG. 7 is a flowchart of an implementation of a process 700 for multiplying signed numbers using the data packing multiplication operations described above. In an implementation, circuitry on hardware accelerator 210 of FIG. 2 implements process 700, although in other implementations, some other circuit or combination of circuits may implement process 700. In the description below of an implementation of process 700, elements to be multiplied, such as matrix elements a-i and vector elements k-m described above, are assumed to be in two's complement representation. In the following description, except as otherwise noted, logical operands are assumed to be in two's complement representation prior to the multiplication operation.

At step 702, the logical operands to be multiplied are converted from two's complement representation to sign magnitude representation, in which the most significant bit represents the sign (e.g., 0=positive, 1=negative) of the number. For example, in the example described above and depicted in FIG. 6A, each of logical operands (a), (b) and (k) are converted from two's complement representation to sign magnitude representation. In embodiments in which logical operands are already in sign magnitude representation, step 702 may be omitted.

Referring again to FIG. 7, at step 704 the sign bit of each logical operand is stripped off and reserved (e.g., in a data register). For example, in the example described above and depicted in FIG. 6A, the sign bit of each of logical operands (a), (b) and (k) is stripped off and saved in memory, such as in a data register in hardware accelerator 210 of FIG. 2.

Referring again to FIG. 7, at step 706 the multiplication operation is performed. For example, the data packing multiplication operations described above in and depicted in FIG. 6A may be performed to produce two multiplication results: a first portion of result Z6 represents the product (b×k), and a second portion of result Z6 represents the product (a×k).

Referring again to FIG. 7, at step 708 the multiple multiplication results are extracted. For example, as described above in connection with FIG. 6A, the twelve least significant bits $z_0, z_1, \ldots, z_{11}$ of result Z6 may be extracted as the product (b×k), and the next twelve bits $z_{12}, z_{13}, \ldots, z_{23}$ of result Z6 may be extracted as the product (a×k).

Referring again to FIG. 7, at step 710 the sign of each multiplication result is determined. In an implementation, an exclusive-OR of the sign bits stripped off at step 704 provide the sign bit for each multiplication result. For example, an exclusive-OR of the sign bits of elements (b) and (k) provides the sign bit of the product (b×k), and an exclusive-OR of the sign bits of elements (a) and (k) provides the sign bit of the product (a×k).

Referring again to FIG. 7, at step 712 the sign bits determined at step 710 are added as the most significant bit of each multiplication result extracted at step 708 to create sign-extend versions of each multiplication result.

At step 714, each sign-extended multiplication result is converted from sign magnitude representation to two's complement representation. In other embodiments, step 714 may be omitted if it is desired to keep the multiplication results in sign magnitude representation.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc., may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

Illustrative Aspects of the Technology

The following summary provides a non-exhaustive list of illustrative aspects of the technology set forth herein.

According to a first aspect, a method is provided that includes providing a hard-wired integer multiplier circuit configured to multiply a first physical operand and a second physical operand, mapping a first logical operand to a first portion of the first physical operand, mapping a second logical operand to a second portion of the first physical operand, and mapping a third logical operand to the second physical operand. The method further includes multiplying the first physical operand and the second physical operand using the hard-wired integer multiplier circuit to provide a multiplication result that includes a first portion including a product of the first logical operand and the third logical operand, and a second portion including a product of the second logical operand and the third logical operand.

According to a second aspect, the method further includes inserting zero padding bits between the first portion of the first physical operand and the second portion of the first physical operand.

According to a third aspect, a number of zero padding bits includes a maximum word length of the first logical operand, the second logical operand, and the third logical operand.

According to a fourth aspect, a number of zero padding bits includes less than a maximum word length of the first logical operand, the second logical operand, and the third logical operand.

According to a fifth aspect, the method further includes coupling the first portion of the multiplication result to a first accumulator, and coupling the second portion of the multiplication result to a second accumulator.

According to a sixth aspect, the method further includes converting the first logical operand to a sign magnitude representation before mapping the first logical operand to the first portion of the first physical operand, converting the second logical operand to a sign magnitude representation before mapping the second logical operand to the second portion of the first physical operand, and converting the third logical operand to a sign magnitude representation before mapping the third logical operand to the second physical operand.

According to a seventh aspect, the method further includes extracting the first portion of the multiplication result, extracting the second portion of the multiplication result, converting the extracted first portion of the multiplication result to two's complement representation, and converting the extracted second portion of the multiplication result to two's complement representation.

According to an eighth aspect, the method further includes mapping a fourth logical operand to a third portion of the first physical operand, wherein multiplying further provides a multiplication result that includes a third portion including a product of the fourth logical operand and the third logical operand.

According to a ninth aspect, the first logical operand includes a bit width R, the second logical operand includes a bit width S, the third logical operand includes a bit width U, an (R+U) least significant bits of the multiplication result includes the product of the first logical operand and the third logical operand, and an (S+U) next most significant bits of the multiplication result includes the product of the second logical operand and the third logical operand.

According to a tenth aspect, the hard-wired integer multiplier can be configured to varying native bit widths.

According to an eleventh aspect, the hard-wired integer multiplier includes a field programmable gate array.

According to a twelfth aspect, a machine learning algorithm includes a matrix including a first element including the first logical operand and a second element including the second logical operand, and a vector including an element including the third logical operand, and the multiplication result includes a first element of a matrix-vector multiplication and a second element of the matrix-vector multiplication.

According to a thirteenth aspect, an apparatus is provided that includes a processor and a hard-wired integer multiplier circuit configured to multiply a first physical operand and a second physical operand. The processor is configured to map a first logical operand to a first portion of the first physical operand, map a second logical operand to a second portion of the first physical operand, and map a third logical operand to the second physical operand, and multiply the first physical operand and the second physical operand using the hard-wired integer multiplier circuit to provide a multiplication result that includes a first portion including a product of the first logical operand and the third logical operand, and a second portion including a product of the second logical operand and the third logical operand.

According to a fourteenth aspect, the processor is further configured to insert zero padding bits between the first portion of the first physical operand and the second portion of the first physical operand.

According to a fifteenth aspect, a number of zero padding bits includes a maximum word length of the first logical operand, the second logical operand, and the third logical operand.

According to a sixteenth aspect, a number of zero padding bits includes less than a maximum word length of the first logical operand, the second logical operand, and the third logical operand.

According to a seventeenth aspect, the apparatus further includes a first accumulator coupled to the first portion of the multiplication result, and a second accumulator coupled to the second portion of the multiplication result.

According to an eighteenth aspect, the apparatus further includes a field programmable gate array.

According to a nineteenth aspect, a method is provided that includes providing a hard-wired integer multiplier circuit configured to multiply a first physical operand and a second physical operand, converting a first logical operand, a second logical operand and a third logical operand from two's complement representation to sign magnitude representation, removing a first sign bit from the first logical operand, a second sign bit from the second logical operand, and third sign bit from the third logical operand, mapping the first logical operand to a first portion of the first physical operand, mapping the second logical operand to a second portion of the first physical operand, and mapping a third logical operand to the second physical operand, multiplying the first physical operand and the second physical operand using the hard-wired integer multiplier circuit to provide a multiplication result that includes a first portion including a product of the first logical operand and the third logical operand, and a second portion including a product of the second logical operand and the third logical operand, extracting the first portion of the multiplication result and the second portion of the multiplication result, creating a sign-extended first portion of the multiplication result by adding a sign bit to the extracted first portion of the multiplication result based on the first sign bit and the third sign bit, and creating a sign-extended second portion of the multiplication result by adding a sign bit to the extracted second portion of the multiplication result based on the second sign bit and the third sign bit, and converting the sign-extended first portion of the multiplication result to two's complement representation and converting the sign-extended second portion of the multiplication result to two's complement representation.

According to a twentieth aspect, the hard-wired integer multiplier includes a field programmable gate array.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
providing a hard-wired integer multiplier circuit configured to multiply a first physical operand and a second physical operand;
mapping a first logical operand to a first portion of the first physical operand;
mapping a second logical operand to a second portion of the first physical operand;
inserting zero padding bits between the first portion of the first physical operand and the second portion of the first physical operand; and
mapping a third logical operand to the second physical operand; and
multiplying the first physical operand and the second physical operand using the hard-wired integer multiplier circuit to provide a multiplication result that includes a first portion comprising a product of the first logical operand and the third logical operand, and a second portion comprising a product of the second logical operand and the third logical operand.

2. The method of claim 1, wherein a number of zero padding bits comprises a maximum word length of the first logical operand, the second logical operand, and the third logical operand.

3. The method of claim 1, wherein a number of zero padding bits comprises less than a maximum word length of the first logical operand, the second logical operand, and the third logical operand.

4. The method of claim 1, further comprising coupling the first portion of the multiplication result to a first accumulator, and coupling the second portion of the multiplication result to a second accumulator.

5. The method of claim 1, further comprising:
converting the first logical operand to a sign magnitude representation before mapping the first logical operand to the first portion of the first physical operand;
converting the second logical operand to a sign magnitude representation before mapping the second logical operand to the second portion of the first physical operand; and
converting the third logical operand to a sign magnitude representation before mapping the third logical operand to the second physical operand.

6. The method of claim 5, further comprising:
extracting the first portion of the multiplication result;
extracting the second portion of the multiplication result;
converting the extracted first portion of the multiplication result to two's complement representation; and
converting the extracted second portion of the multiplication result to two's complement representation.

7. The method of claim 1, further comprising mapping a fourth logical operand to a third portion of the first physical operand, wherein multiplying further provides a multiplication result that includes a third portion comprising a product of the fourth logical operand and the third logical operand.

8. The method of claim 1, wherein:
the first logical operand comprises a bit width R;
the second logical operand comprises a bit width S;
the third logical operand comprises a bit width U;
an (R+U) least significant bits of the multiplication result comprises the product of the first logical operand and the third logical operand; and
an (S+U) next most significant bits of the multiplication result comprises the product of the second logical operand and the third logical operand.

9. The method of claim 1, wherein the hard-wired integer multiplier can be configured to varying native bit widths.

10. The method of claim 1, wherein the hard-wired integer multiplier comprises a field programmable gate array.

11. The method of claim 1, wherein a machine learning algorithm comprises a matrix comprising a first element comprising the first logical operand and a second element comprising the second logical operand, and a vector comprising an element comprising the third logical operand, and the multiplication result comprises a first element of a matrix-vector multiplication and a second element of the matrix-vector multiplication.

12. An apparatus comprising:
a hard-wired integer multiplier circuit configured to multiply a first physical operand and a second physical operand; and
a processor configured to:
map a first logical operand to a first portion of the first physical operand;
map a second logical operand to a second portion of the first physical operand;
insert zero padding bits between the first portion of the first physical operand and the second portion of the first physical operand;
map a third logical operand to the second physical operand; and
multiply the first physical operand and the second physical operand using the hard-wired integer multiplier circuit to provide a multiplication result that includes a first portion comprising a product of the first logical operand and the third logical operand, and a second portion comprising a product of the second logical operand and the third logical operand.

13. The apparatus of claim 12, wherein a number of zero padding bits comprises a maximum word length of the first logical operand, the second logical operand, and the third logical operand.

14. The apparatus of claim 12, wherein a number of zero padding bits comprises less than a maximum word length of the first logical operand, the second logical operand, and the third logical operand.

15. The apparatus of claim 12, further comprising a first accumulator coupled to the first portion of the multiplication result, and a second accumulator coupled to the second portion of the multiplication result.

16. The apparatus of claim 12, comprising a field programmable gate array.

17. One or more computer storage media comprising computer-executable instructions directed to:
mapping a first logical operand to a first portion of a first physical operand;
mapping a second logical operand to a second portion of the first physical operand;
inserting zero padding bits between the first portion of the first physical operand and the second portion of the first physical operand; and
mapping a third logical operand to a second physical operand; and
multiplying the first physical operand and the second physical operand using a hard-wired integer multiplier circuit to provide a multiplication result that includes a first portion comprising a product of the first logical operand and the third logical operand, and a second portion comprising a product of the second logical operand and the third logical operand;
wherein the hard-wired integer multiplier circuit is configured to multiply the first physical operand and the second physical operand.

18. The one or more computer storage media of claim 17, wherein a number of zero padding bits comprises less than a maximum word length of the first logical operand, the second logical operand, and the third logical operand.

19. The one or more computer storage media of claim 17, comprising further computer-executable instructions directed to:
converting the first logical operand to a sign magnitude representation before mapping the first logical operand to the first portion of the first physical operand;
converting the second logical operand to a sign magnitude representation before mapping the second logical operand to the second portion of the first physical operand; and
converting the third logical operand to a sign magnitude representation before mapping the third logical operand to the second physical operand.

20. The one or more computer storage media of claim 19, comprising further computer-executable instructions directed to:
extracting the first portion of the multiplication result;
extracting the second portion of the multiplication result;
converting the extracted first portion of the multiplication result to two's complement representation; and
converting the extracted second portion of the multiplication result to two's complement representation.

* * * * *